Jan. 23, 1923.

H. A. DEWING.
TYPEWRITING MACHINE.
FILED FEB. 18, 1920.

INVENTOR:
Henry A Dewing
BY D C Stickney
ATTORNEY.

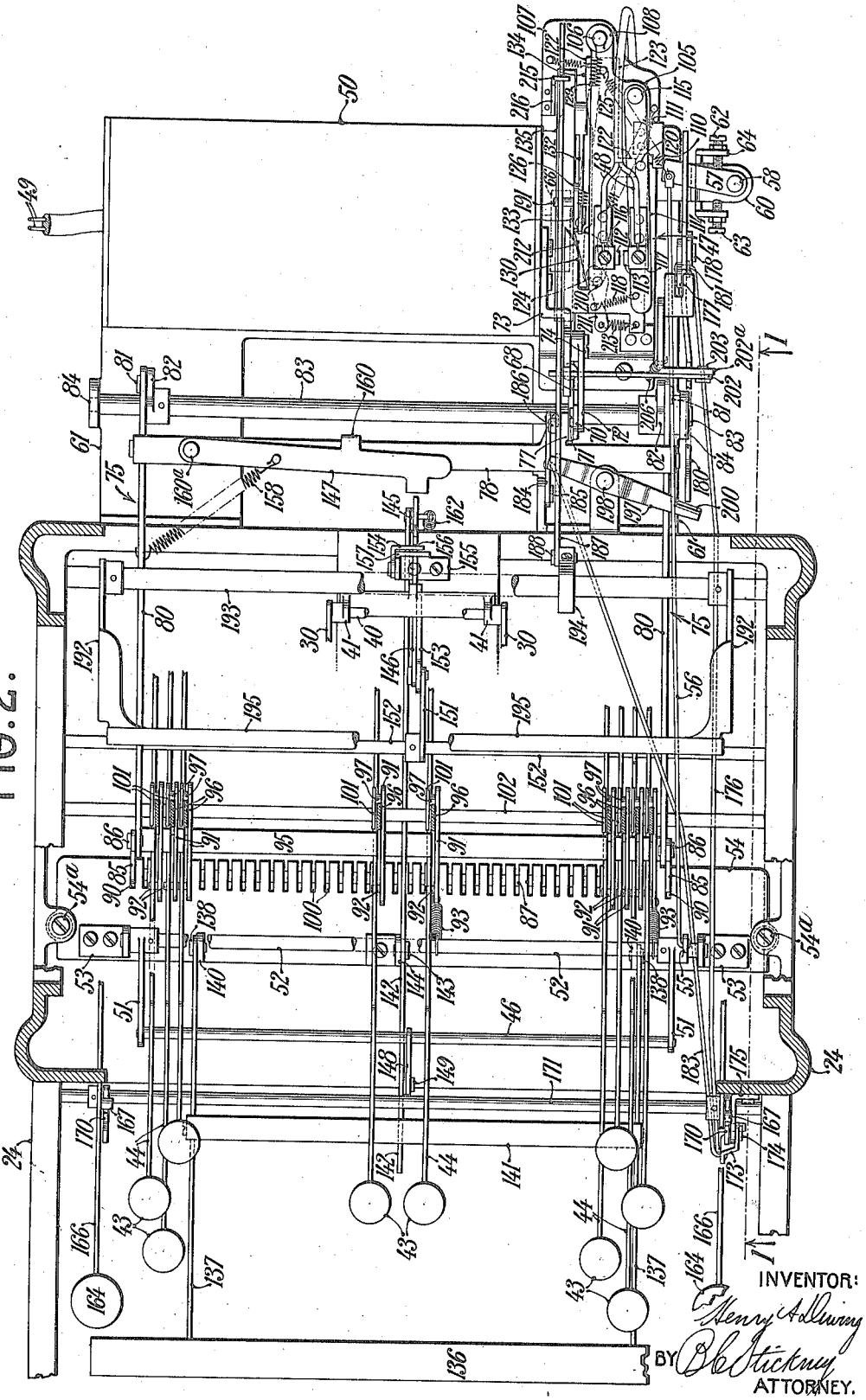

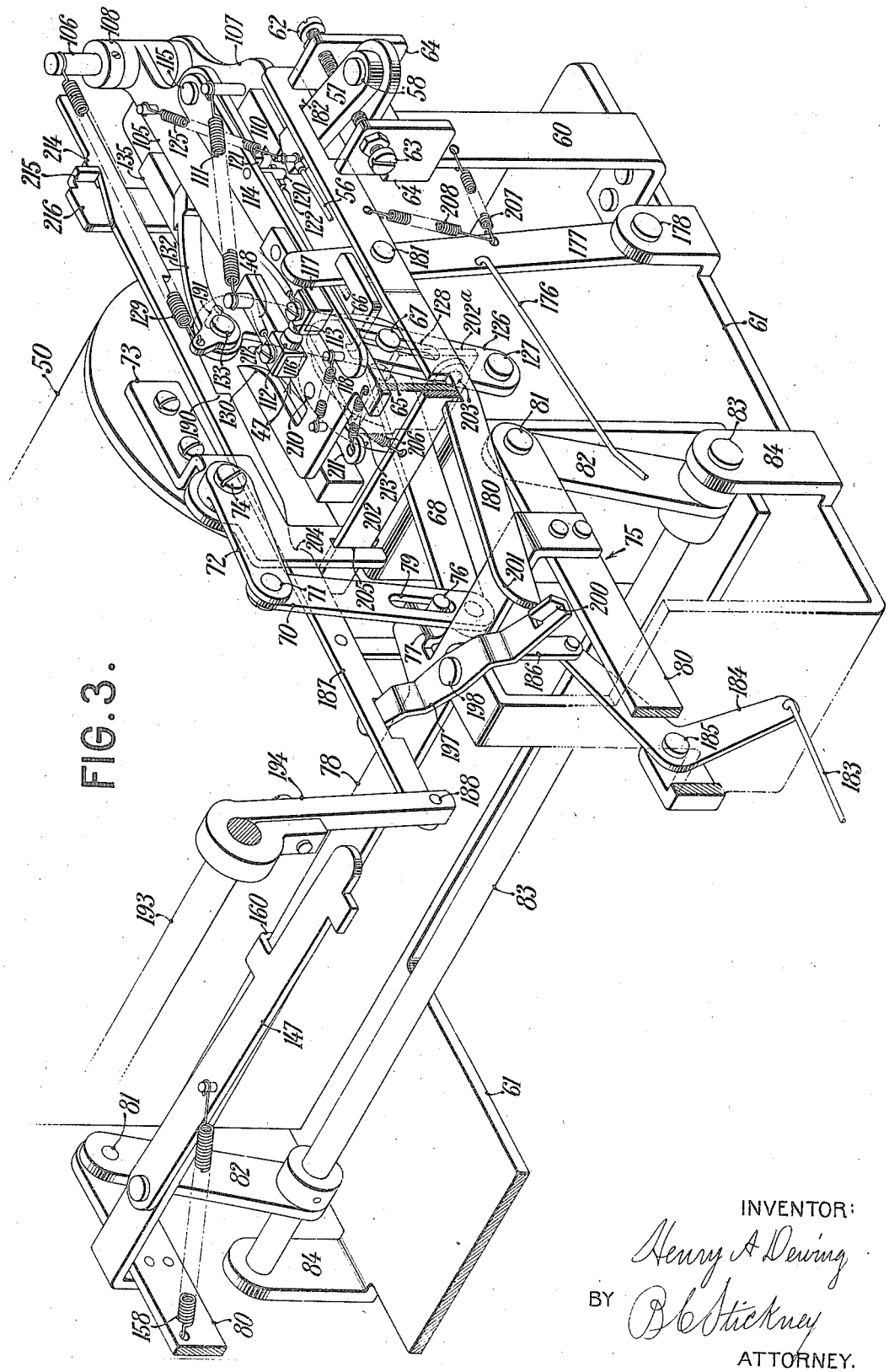

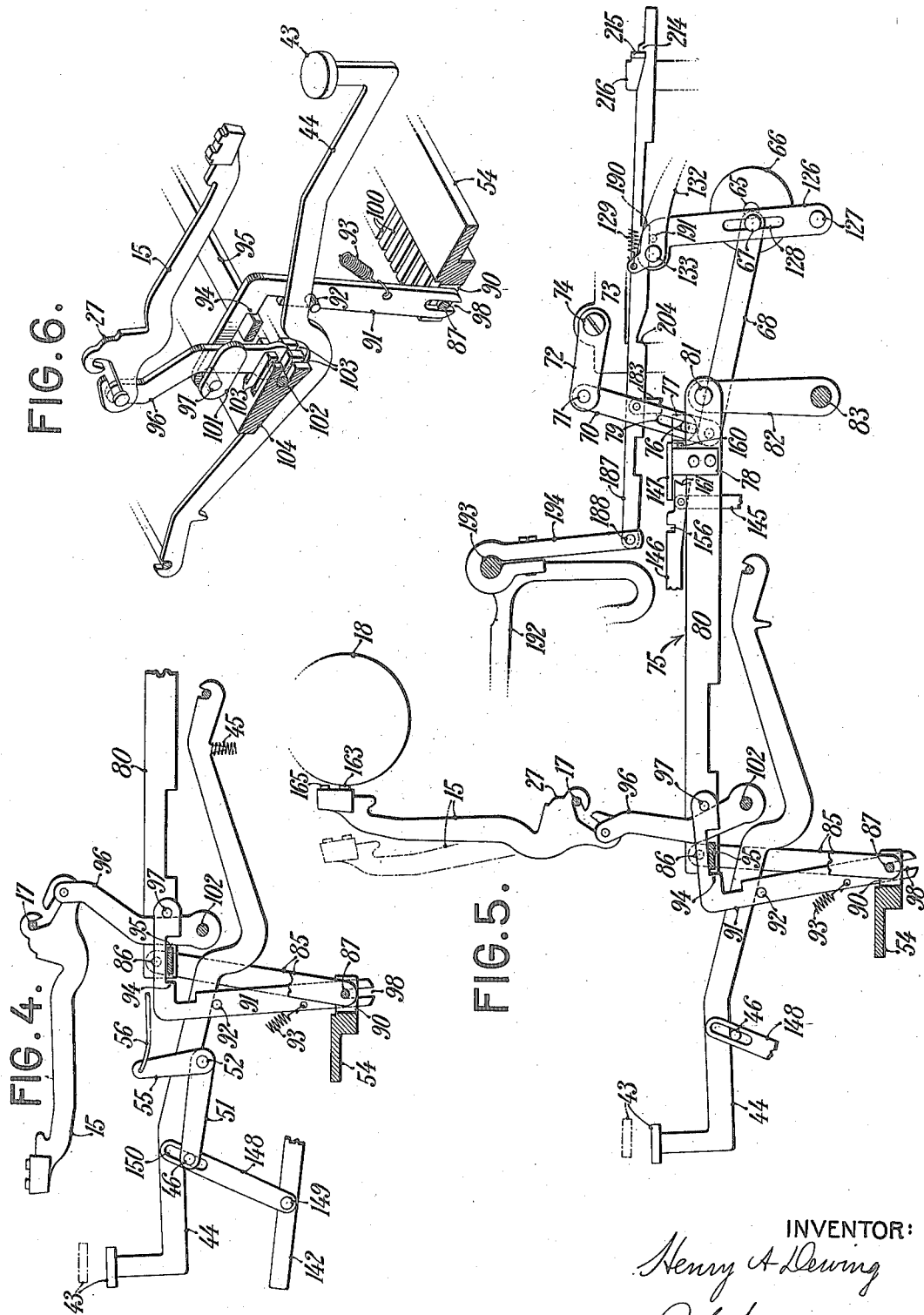

Jan. 23, 1923.
H. A. DEWING.
TYPEWRITING MACHINE.
FILED FEB. 18, 1920.
1,443,070
6 SHEETS-SHEET 5
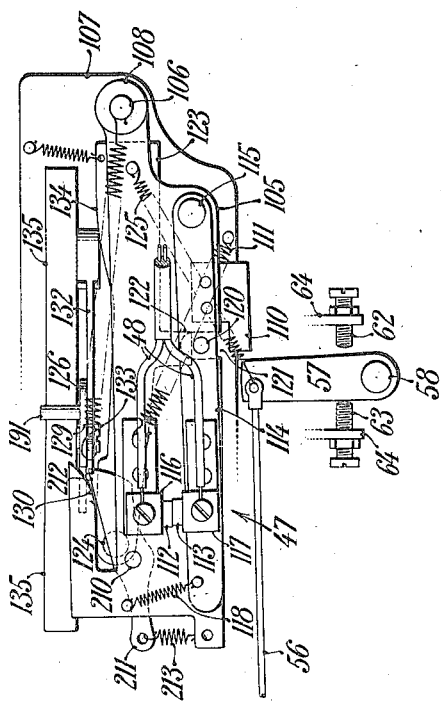
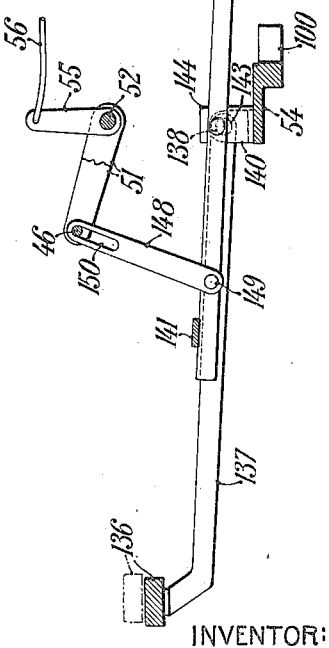
INVENTOR:
Henry A. Dewing
BY B. C. Stickney
ATTORNEY.

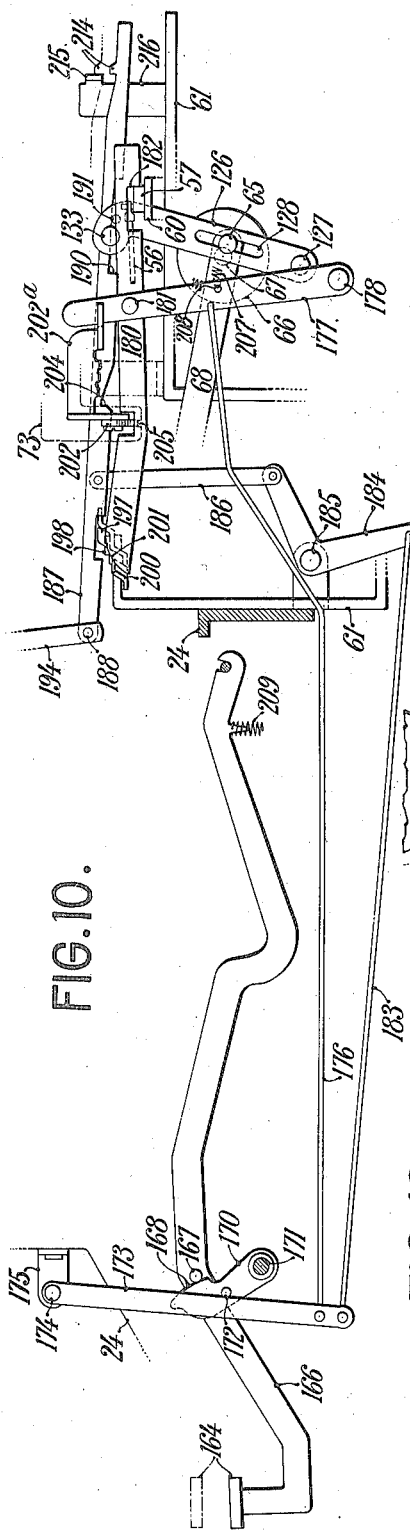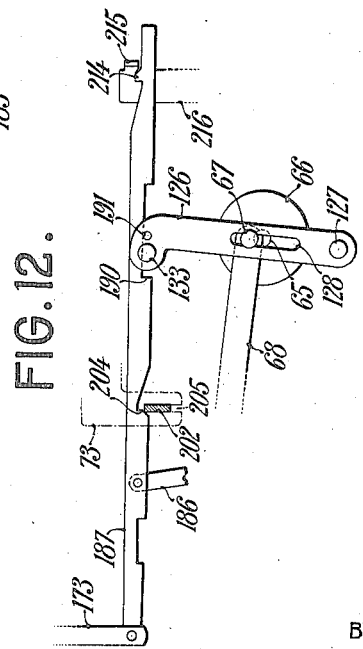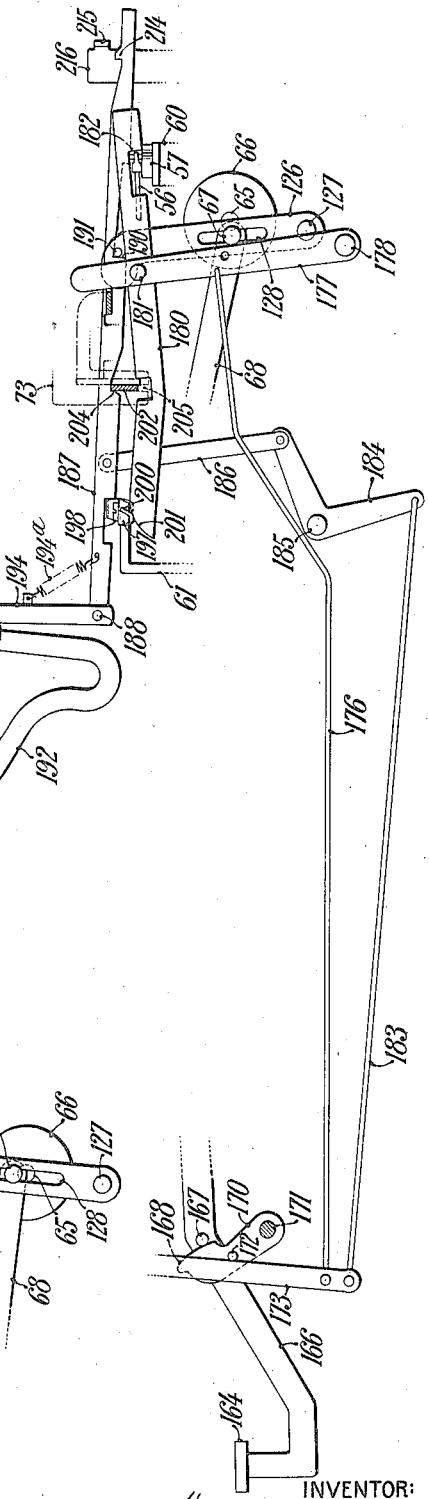

Patented Jan. 23, 1923.

1,443,070

UNITED STATES PATENT OFFICE.

HENRY A. DEWING, OF SANTA BARBARA, CALIFORNIA, ASSIGNOR TO UNDERWOOD TYPEWRITER COMPANY, OF NEW YORK, N. Y., A CORPORATION OF DELAWARE.

TYPEWRITING MACHINE.

Application filed February 18, 1920. Serial No. 359,639.

*To all whom it may concern:*

Be it known that I, HENRY A. DEWING, a citizen of the United States, residing in Santa Barbara, in the county of Santa Barbara and State of California, have invented certain new and useful Improvements in Typewriting Machines, of which the following is a specification.

This invention relates to typewriting machines, and more particularly to the kind in which the type-bars are motor driven to print against a platen on a traveling carriage.

In such machines the type-bars are usually driven by a constantly running motor or driver to which the type-bars may be connected by the actuation of their respective keys. This results in an undesirable violent shock which the type-bar connections receive by suddenly connecting them with the motor running at full speed.

The object of the present invention is to drive the type-bars by an intermittent motor, which functionates at the depression of the type-key-levers, thereby eliminating shock and also noise which would otherwise result every time a type-bar is connected to the motor.

For this purpose an electric motor may be connected in a circuit with a switch, each type-key-lever being operable to effect the closing of said switch, to start the motor to operate the corresponding type-bar by a universal driver connected to the motor; suitable mechanism being provided to open the switch to stop the motor after the type-bar has been driven to the printing point.

The type-bars may be rendered effective through the medium of connectors operable by the type-key-levers to bring them into engaging relation with the driver, so that they may be operated by the latter and swing the type-bars to and away from the platen.

The carriage may be fed by escapement mechanism, including a dog rocker, which is operated by a universal bar through the intermediary of the type-bars at each operation of the type-bar driver.

A space bar is provided which is effective to operate a normally ineffective connection between the dog rocker and driver, through the intermediary of which the escapement mechanism may be operated by the motor when the space-bar is depressed; the latter being effective to close the motor switch to start the motor.

Mechanism is also provided to shift the platen from lower-case position to uppercase position, by said motor upon the depression of a shift key adapted to close the motor switch.

Provision is further made to lock the platen in upper-case position and to release it by the operation of a type-key.

Other features and advantages will hereinafter appear.

In the accompanying drawings,

Figure 2 is a top plan view of the machine, showing the general arrangement of parts, the section being taken on the line 2—2 of Figure 1, and some of the parts being omitted.

Figure 3 is a perspective view, showing the various connections for closing the motor switch to start the motor, and the universal frame for actuating the type-bars. This figure also shows the connection between the motor and the case-shifting mechanism.

Figure 4 is a diagrammatic side view, showing one of the type-keys depressed to close the motor switch, and an intermediate connecting element brought into engaging relation with the universal driver prior to the operation of the latter.

Figure 5 is a view similar to Figure 4 and shows the type-bar operated.

Figure 6 is a perspective view showing one of the connectors between a type-bar and a key-lever.

Figure 7 is a top plan view of the motor switch, and shows the parts in position after the closing of the switch has been effected by a trip-lever operable by the key-levers, and just prior to the starting of the motor.

Figure 8 is a view similar to Figure 7, and shows the switch swung about its pivot, during the operation of the motor, to permit the trip-lever to resume its normal position.

Figure 9 is a diagrammatic side view showing the dog-rocker operated by the motor to feed the carriage by the depression of the space-bar.

Figure 10 is a diagrammatic side view showing a shift-key depressed to effect the closing of the motor switch by mechanism operable by the shift-key. This figure further shows a normally ineffective connection rendered effective, so that it may be operated by the motor to shift the platen to upper-case position.

Figure 11 is a view similar to Figure 10, but shows the platen shifted to its upper-case position by the motor, and the switch connection moved out of effective relation with the trip-lever to permit the latter to resume its normal position.

Figure 12 is a diagrammatic side view, showing the platen-shifting mechanism being released by the motor.

Figure 1:
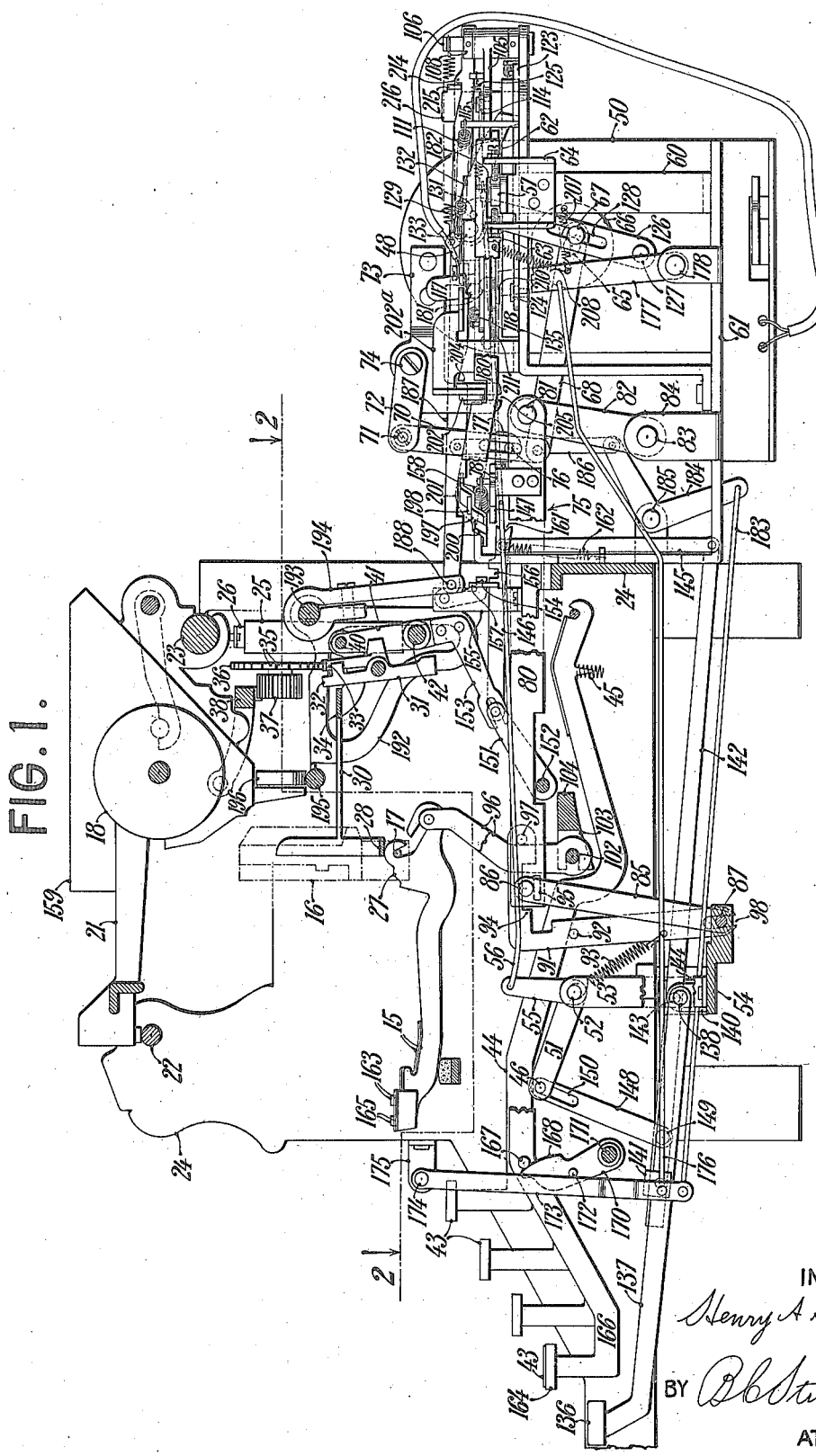
Figure 1 is a sectional side view of a typewriting machine, showing my invention applied thereto, the section being taken substantially on line 1—1 of Figure 2.

One form of the invention is herein illustrated as applied to the Underwood typewriting machine, in which type-bars 15 are radially arranged on a segment 16, so that they may be swung about a fulcrum-rod 17 to print at a common printing point at the front side of a rotatable platen 18, supported on a carriage 21. The carriage travels on the usual front rail 22 and the rear rail 23 secured to the main frame 24 of the machine, and is urged from right to left by a spring-drum 25 connected to the carriage by a strap 26.

Letter-feeding movements of the carriage are effected by heels 27 on the type-bars 15, the heels engaging with a curved universal-bar 28 of a floating frame 30 to move the latter rearwardly to cause a dog-rocker 31, having a fixed dog 32 and a loose dog 33 thereon, to be operated by means of a cross-bar 34 on said frame 30, to reciprocate the dogs 32 and 33 between the teeth 35 of an escapement wheel 36, the escapement wheel having the usual one-way connection with a pinion 37 meshing with a pivoted feed-rack 38 on the carriage 21. The usual return spring (not shown) is effective to assist in the reciprocation of the dog-rocker 31. The floating frame, comprising the universal-bar 28, is supported at the rear thereof, where it is pivotally connected at 40 to a swing frame comprising upwardly extending arms 41 secured to a rock-shaft 42 pivotally supported on the usual escapement bracket (not shown).

Type-keys 43 are provided by which the operation of the type-bars 15 may be effected. Said keys, when depressed, swing the key-levers 44 against the tension of return springs 45, but instead of operating the type-bars directly, as in Underwood machines, the key-levers 44 engage a universal-bar 46 to close a switch 47 (Figures 2 and 3) in an electric circuit comprising conductors 48 and 49 and an electric motor 50, to cause the latter to make a cycle, and through suitable mechanism, presently to be described, operate the type-bar corresponding to the depressed key; the conductors 49 being connected to any suitable source of electric current. The universal-bar 46 underlies all of the key-levers 44, and is carried by arms 51 secured to a rock-shaft 52, carried by suitable brackets 53 extending upwardly from a cross-bar or plate 54 secured to the main frame 24 by screws 54ª (Figure 2). The rock-shaft 52 is provided near its right-hand end with an upwardly extending arm 55, which, as the universal-bar 46 is actuated by a type-key 43, pulls a link 56 forwardly to move a trip-lever 57 from its normal position in Figure 2, to the Figure 7 position, thus permitting the motor switch 47 to be closed in a manner hereinafter described. The trip-lever 57 is pivoted at 58 on a bracket 60, secured to a base plate 61, the latter being secured to the back of the main frame 24; the trip-lever being limited in its movements by adjusting screws 62 and 63 threaded into ears 64 of the bracket 60.

The motor 50 is secured to the base plate 61, and is provided with a shaft 65 having secured thereto a disk 66 with a crank-pin 67 projecting laterally therefrom, thus forming a crank-arm by which a connecting rod 68 is moved forwardly when the motor starts to swing an intermediate lever 70, pivoted at 71 on an arm 72, secured to a bracket 73 by a screw 74 on the motor 50. The lever 70 is connected to reciprocate an actuating frame or driver 75 by means of a pin 76 projecting laterally from an ear 77 on a cross-bar 78 of the frame 75; said pin projecting into a slot 79 in the lever 70. The driver-frame 75 comprises two end bars 80, and is floatingly supported at the rear thereof, by studs 81 on upwardly extending arms 82 of a rock-shaft 83 supported in ears 84 of the base plate 61. At its forward end, the driver is supported and guided by links 85 pivotally connected thereto at 86 and supported to swing on a rod 87 within the cross-plate 54; said links being guided in slots 90 of said plate. Each key-lever 44 has associated therewith a connector or interponent 91, which, when the key-lever is depressed, is moved downwardly by a stud 92 underlying the key-lever, and against the tension of a return spring 93. A shoulder 94 of the connecting member 91 is thus moved into the path (Figure 4) of a universal-bar or cross-bar 95 fastened between the end bars 80 of the driver-frame 75. This movement occurs just prior to the closing of the motor switch 47. As soon as the switch is closed, the driver-frame 75 is moved forwardly, and the universal-bar 95 engages the shoulder 94 to swing the effective connector 91 about the rod 87, to operate an intermediate lever or a sub-lever 96 by means of a projection or stud 97 engaging in back of said sub-lever, the latter swinging the type-bar 15 to the printing point.

The lower ends of the connectors 91 are slotted at 98 to straddle the rod 87, and are guided in slots 100 in the bar 54. The upper ends are provided with extensions in the form of plates 101 (Figure 6) secured to said connectors, so that each one as a whole, embraces the associated sub-lever 96 to be guided thereby to keep the stud 92 in the plane of actuation of the key-lever 44.

The intermediate levers are pivoted on a common fulcrum rod 102, and are guided in slots 103 in a bar 104 supported between the ends of the main frame 24.

The forward movement of the driver, comprising the universal-bar 95, is not sufficient to positively move the type-bar to the printing point; it drives it positively to approximately the dotted line position (Figure 5), but, due to the rapid operation of said driver, the type-bar will have attained momentum sufficiently great, when the actuating frame reaches its forward position (Figure 5), to cause it to print against the platen and permit it to rebound quickly from the platen. As the motor 50 continues to rotate to complete the cycle, the driver 75 is brought back to its normal position, the universal-bar 95 being at this time effective to swing the sub-lever 96 and consequently the type-bar 15 back to their normal positions.

With this arrangement, the driver 75 is effective to swing the type-bars to the platen, and back to their normal positions, thus eliminating the necessity of restoring springs for the type-bars 15, the tension of which would ordinarily have to be overcome when the type-bars are operated. The switch 47 is opened near the end of a complete revolution of the motor 50, in a manner hereinafter to be described.

The impact of the type-bars 15 against the platen may be varied, according to the number of manifold copies to be made, by increasing or decreasing the movement of the actuating frame 75, and consequently varying the distance the type-bars travel by momentum. For this purpose, the slot 79 in the lever 70 is elongated, and the pivot 71 may be moved up and down by swinging the arm 72 about the screw 74, after loosening the latter which normally clamps the arm tightly in position against the bracket 73. By raising or lowering the pivot 71, the leverage between said pivot and the point of connection (pin 76) to the actuating frame 75 is increased or decreased, thus causing said actuating frame to move forwardly more or less according to the adjustment of the pivot 71, and consequently causing the universal-bar 95 to have a greater or less driving effect on the type-bars.

The motor switch 47, which is normally open, comprises a body portion 105 (Figures 3, 7 and 8), pivoted on a stud 106 of a bracket 107, secured to the base plate 61. The body portion 105 is held in place on said stud by a collar 108, and is provided with a lug or projection 110 held against the trip-lever 57 by a spring 111. When the trip-lever 57 is moved out of engagement with the projection 110 (Figure 7) by the actuation of one of the type-keys, the spring 111 swings the body portion 105 to bring a fixed contact 112 thereon into engagement with a contact 113 on a switch lever 114 pivoted at 115 on the body portion 105, thus closing the switch to start the motor and drive the type-bar, as herein described. The contacts 112 and 113 form terminals for the conductors 48, and are mounted on blocks 116 and 117 of insulating material secured to the body portion 105 and the switch lever 114, respectively. The free end of the switch lever 114 is connected by a spring 118 to the body portion 105, and has a tendency to swing said lever 114 to bring the contacts 112 and 113 together. This is prevented, however, when the parts are in their normal positions (Figures 2 and 3) by a pin 120 projecting downwardly from the switch lever 114 through a notch 121, said pin engaging with a lug 122 on a cam lever 123 pivoted at 124 on the bracket 107; said lever being located under the body portion 105 of the switch.

As soon as the motor starts, the switch 47, as a whole, is swung about its pivot to permit the trip-lever 57 to resume its normal position. To do this there is provided an operating arm 126 pivoted on a stud 127 on the motor 50; said arm having a slot 128 into which the pin 67 projects to cause the arm to be operated by the motor. The upper end of arm 126 engages during its forward movement with a cam 130 on the body 105 of the switch, to swing the switch, as a whole, about the pivot 106 and move the projection 110 thereon out of the path of the trip-lever 57 (Figure 8), thus permitting the trip-lever to be restored to its normal position, in back of the projection 110, by a spring 125, so that it may assist in opening said switch, as will hereinafter appear.

On the return stroke of the operating arm 126, which may be assisted in this movement by a spring 129 (the trip-lever 57 having been restored to its normal position), a pawl 132 pivoted at 133 thereon engages, during the latter part of the movement of said arm, with a cam 134 on the cam lever 123, to operate said lever to move the contact 113, on the switch lever 114, away from the contact 112 by means of the lug 122 and pin 120. Thus, the parts are restored to position where the trip-lever may again be actuated to close the switch, by the depression of the next type-key. A block 135 may be secured to the bracket 107 to serve as the backing for the pawl 132 to prevent a sidewise movement thereof. It should be understood that the trip-lever 57 is instrumental in assisting to close said switch, and consequently said switch can be closed only when the trip-lever is in its normal position.

A space-bar 136 is carried by two forwardly projecting arms 137, pivotally mounted at 138 on brackets 140 secured to the cross-plate 54. The arms 137 are secured to each other by a cross-bar 141, which, when the space-bar is actuated, swings a lever 142 about its pivot 143 on a bracket 144 secured to the cross-bar 54; the rear end of said lever 142 pushing a link 145 upwardly to raise an interponent 146 into the path of a lever 147 mounted on the cross-bar 78 of the driver 75 to be operated thereby. When the lever 142 is actuated by the depression of the space-bar, the universal-bar 46, which underlies the key-levers 44, is also operated by means of a link 148, effective to actuate the universal-bar 46 to close the motor switch 47 by means of the connection including the arm 55 and the link 56, hereinbefore described; the link 148 being pivotally connected at 149 to the lever 142 and provided with a slot 150, so as to embrace the universal-bar 46; the slot 150 being elongated to permit the universal-bar 46 to be actuated by the key-levers 44 without disturbing the lever 142. As soon as the switch is closed, the overlap between the motor-trip-lever 57 and the lug 110 being great enough to first effect the movement of the interponent to its effective position, the motor moves the driver 75 forwardly, thus causing the member 147 to engage with the interponent and push the latter forwardly. The interponent 146 is pivotally connected to the usual arm 151 projecting upwardly from the usual ribbon-feed-shaft 152, to actuate the latter, the arm 151 engaging with a downwardly projecting arm 153 on the rock-shaft 42 to rock the latter, to operate the floating frame 30, and consequently the dog-rocker 31 of the escapement mechanism, to effect a letter-space movement of the carriage 21. The movement of the interponent 146, when operated by the driver 75, is limited to avoid excess movement of the dog-rocker 31. This may be done by means of a stop 154 pivotally supported on a bracket 155. Said stop finds its way into a notch 156 of said interponent when the latter is raised to its effective position, and bears against an ear 157 of the bracket 155. The driver frame 75 is always moved the same distance by the motor, but the movement required of said driver, to operate the type-bars 15, is greater than that required to operate the interponent 146; consequently, the lever 147 is yieldingly connected to the cross-bar 78 of the actuating frame, by a spring 158 which causes a projection 160 thereon to bear against the back of the cross-bar. With this construction, the interponent may be arrested while the driver completes its forward movement, the lever 147 swinging, at this time, idly about its pivot 160ª.

The power required to operate the dog-rocker 31 to letter-feed the carriage is less than that required to operate the type-bars 15, but the yielding connection comprising the spring 158 is effective to increase the resistance, offered to the operating frame 75 and consequently to the motor 50, to equal the resistance of the type-bars, so that the motor alway meets with a uniform resistance irrespective of whether it is operating the type-bars or letter-spacing the carriage.

To maintain the connection between the driver 75 and the interponent 146 during the operation of the latter, the interponent 146 is provided with a cut-out 161 (Figure 9), into which the lever 147 of the driver fits, to prevent the breaking of said connection until the driver is restored to its normal position, when a spring 162 restores the interponent 146 and the connected parts including the space-bar 136.

The platen 18 is shiftingly supported by a platen frame 159 supported, in the usual manner, on the carriage 21. Usually the platen is in position to permit lower-case types 163 to be used. Provision is herein made to shift the platen 18 by the actuation of a case-shift-key 164, to faciliate typing with upper-case types 165, but, instead of shifting the platen directly by the shift-key, as in the Underwood typewriting machine, said key is effective only to close the motor switch 47 to start said motor, and render suitable mechanism effective so that the platen may be shifted thereby.

The shift-key 164 is carried by the forward end of a shift-key-lever 166 (Figure 1) which, when depressed, causes a stud 167 thereon to engage with a cam 168 of an arm 170 mounted on a rock-shaft 171, to swing said arm and cause a pin 172 thereon to actuate a sub-lever 173 pivotally supported at 174 on a bracket 175 secured to the main frame 24. The lever 173 has connected thereto, at its lower end, a rearwardly-extending link 176 to operate a lever 177 located at the rear of the machine to swing it about a fixed pivot 178. The lever 177 carries a circuit closing lever 180 (Figure 3) pivotally mounted on a stud 181 secured to said lever and which is moved forwardly thereby to operate the trip-lever 57 by a shoulder 182, and consequently effect the closing of the motor switch, as hereinbefore described. While the trip-lever 57 is being operated, a second link 183, connected at the lower end of the lever 173, is also pulled forwardly to rock a bell-crank 184, pivoted on a fixed stud 185, to cause said bell-crank to pull downwardly on a link 186 and swing a thrust bar 187, about its pivot 188, from its normal position (Figure 1) to the position indicated in Figure 10, thus bringing a shoulder 190 of the thrust bar into the path of a stud 191 on the operating arm 126, which is driven by the motor. As soon as the switch is closed, the motor operates the arm 126, and the stud 191 then engages with the shoulder 190 to move the thrust bar 187 forwardly, to rock the usual shift-frame 192 about the axis of a rod 193, forming part of said shift-frame, by means of an arm 194 secured to said rod and connected to the thrust bar 187. Thus a rail 195 of the shift-frame engages a roller 196 on the platen frame 159 to shift the latter with the platen 18 to upper-case position.

During the forward movement of the thrust bar 187, a substantially horizontally-disposed sub-lever 197 is swung about its pivot 198 to depress the forward end of the circuit closing lever 180 by means of a lip 200 engaging with a cam face 201 on said lever, to raise the shoulder 182 out of engaging relation with the trip-lever 57, thus permitting the latter to be restored to its normal position by the spring 125.

A latch 202 pivoted at 203 on the bracket 202ª snaps in back of a shoulder 204 on the thrust bar to hold it in its operated position, and consequently hold the platen 18 in its upper-case position. The latch may be guided in a slot 205 of the bracket 73 and moves against the tension of a spring 206.

As the motor completes its revolution, the operating arm 126 is restored to normal position. During this time the shift-key is held depressed by the operative to keep the shoulder 204 in back of the latch 202, the thrust bar being slightly resilient to permit the rear end thereof to be moved upwardly by the stud 191 on the operating arm, which would otherwise release said thrust bar from the latch 202 and permit the platen to resume its lower-case position. After the restoration of the operating arm 126, the shift-key lever 166 may be returned by a spring 209 (Figure 10).

The circuit closing lever 180 which is carried by the lever 177 may be moved back from its actuated position, upon the return of the shift-key by a spring 207 connected to the lever 177; a second spring 208 being effective to swing the lever 180 about its pivot 181 to lower the shoulder 182 into effective relation with the trip-lever 57.

After the platen is locked in its shifted upper-case position, the operative proceeds to actuate one of the type-keys 43 to cause the corresponding type-bar 15 to be operated, as hereinbefore described, thus causing the upper-case type 165 thereon to print. As the operating arm 126 moves forwardly during this typing operation, the stud 191 thereon engages under the thrust bar 187 to swing the latter upwardly about its pivot 188 to free the shoulder 204 from the latch 202, so that the platen may be restored to its normal position. Before the inertia of the platen, thrust bar and the connected parts is overcome, however, the stud 191 engages the shoulder on said thrust bar (Figure 11), to prevent the immediate return of said thrust bar until after the typing of the upper-case type has taken place. On the return stroke of said operating arm, however, the thrust bar 187 is again swung about its pivot 188 to raise the shoulder 204 clear of the latch, thus permitting the thrust bar 187 and the parts moved thereby, including the platen 18, to be restored to their normal positions which may be done by gravity.

It will be understood that with this construction, when the typist desires to type an upper-case character, such as a capital letter, for example, which may be the first letter of a word, the shift-key is actuated to cause the motor to shift the platen, in which position it is locked by the latch 202, the platen-shift or case-shift mechanism being released by the depression of a type-key 43. To type an indefinite number of capitals or upper-case characters, the operator may hold the shift-key in its depressed position.

To prevent accidental operation of the actuating arm which may result from overthrow, and also prevent rotation of the motor, except when the switch is closed by one of the type-keys 43, the space-bar 136 or one of the shift-keys 164, there is pivotally mounted at 210 on the body portion 105 of the motor switch (Figures 2, 7 and 8) a locking lever 211 having a toe 212 normally held in the path of the operating arm 126 against the cam 130, by a spring 213. When the trip-lever is operated, however, and the switch, as a whole, swings about its pivot as hereinbefore described, the toe 212 of the locking lever 211 is moved to one side, or out of the path of the operating arm 126 (Figure 7), thus permitting the latter to move forwardly when the motor starts. As soon as the operating arm 126 comes back to its normal position, however, the toe snaps out into the path of said arm, providing the finger of the typist has been removed from the depressed key, thereby preventing a successive operation of the operating arm which might otherwise be caused by an overthrow of the motor. Thus it will be seen that the locking lever 211 also prevents overthrow of the motor. It should be understood that the spring 129 also has a tendency to prevent overthrow of the motor.

To prevent accidental shifting of the platen 18, or any possible rattling of the platen shifting mechanism while typing lower-case characters, provision is made to lock the thrust bar 187 in its normal position by means of a nose 214 engaging in back of an ear 215 on a fixed bracket 216 (Figure 1), where it is normally held by the spring 206 which causes the latch 202 to bear against the under side of the thrust bar, said spring being also effective to restore the train of mechanism between the shift-key and the thrust bar.

When it is desired to repeatedly type the same character, as the period, the dash or the underscore mark, any one of which may be used in certain kinds of work, the operator holds the type-key depressed, thus preventing the motor-circuit from being opened; consequently the motor continues to rotate to reciprocate the operating frame to repeatedly swing the same type-bar to the printing point until the finger is removed from the key.

A spring 194ª may be connected between the arm 194 and the thrust bar 187, and may assist in releasing the thrust bar from the latch 202 which occurs when the platen is released, prior to its restoration to its lower-case position. The spring 194ª may also assist in retaining the thrust bar 187 with its nose 214 behind the ear 215, to prevent accidental displacement of the thrust bar, as herein described.

Variations may be resorted to within the scope of the invention, and portions of the improvements may be used without others.

Having thus described my invention, I claim:

1. In a typewriting machine, comprising a platen and type-bars to co-operate therewith, the combination of keys, one for each type-bar, a motor, a driver reciprocable by said motor, means whereby depression of any of said keys will connect the corresponding type-bar with said driver, and means whereby depression of the key will cause the motor to reciprocate the driver to actuate the type-bar connected therewith and to return to its normal position, said driver acting in its return movement to return the actuated type-bar to its normal position, thereby insuring such return of the latter before actuation of another type-bar by the driver.

2. In a typewriting machine, comprising a platen and type-bars, the combination of keys, one for each type-bar, sub-levers, one for each type-bar, each of said sub-levers engaging a type-bar at one end and pivoted on the machine at its other end, interponents, one associated with each sub-lever, projections on said interponents to engage said levers, a driver, said interponents being pivoted and movable into effective relation with said driver by said keys, and means to operate said driver to rotate said sub-levers and drive said type-bars to and away from said platen.

3. In a typewriting machine, comprising a platen and type-bars, the combination of keys, one for each type-bar, sub-levers connected with said type-bars, interponents, a universal driver, said interponents being actuable by said keys to bring them into effective relation with the driver, and means to move said driver back and forth, the latter on its forward stroke being effective to operate the effective interponent to swing the corresponding type-bar to the printing point by the associated sub-lever, the driver being effective on its return stroke to engage the lever associated with the actuated type-bar to restore the latter to its normal position.

4. In a typewriting machine, comprising a platen and type-bars, the combination of key-levers, one for each type-bar, sub-levers connected with said type-bars, interponents, one for each sub-lever, a universal driver arranged in front of said sub-levers, the interponents having studs underlying the associated key-levers, so that any key-lever may bring its associated interponent into effective relation with said universal driver, each interponent having a stud engaging with the associated sub-lever, and means renderable effective by said key-levers to operate the driver to drive the effective interponent, and swing the associated sub-lever, by means of the engaging stud on said interponent, to operate the associated type-bar.

5. In a typewriting machine, comprising a platen and type-bars, the combination of key-levers, one for each type-bar, a motor, a driver operable by said motor, devices operable by said key-levers to connect the type-bars with said driver, a normally open switch, a trip lever operable by said key-levers to effect the closing of said switch to start said motor, means operable by said motor to displace said switch to permit the trip lever to return to normal position and means operable to open said switch, said means comprising said returned lever.

6. In a typewriting machine, comprising a platen and type-bars, the combination of key-levers, one for each type-bar, a motor, an operating arm connected to said motor, a driver connected to said operating arm, devices operable by said key-levers to render the type-bars effective with said driver, a normally open switch for said motor, a trip lever operable by said key-levers to effect the closing of said switch, said operating arm being effective on its forward stroke to displace said switch to permit said trip lever to return to its normal position, and means operable by said operating arm on its return stroke to open said switch.

7. In a typewriting machine, comprising a platen and type-bars, the combination of key-levers, one for each type-bar, a motor, an operating arm connected to said motor, a driver connected to said operating arm, devices operable by said key-levers to render the type-bars effective with said driver, a normally open switch for said motor, said switch comprising a pivoted body portion, a terminal fixed thereon, a switch lever pivoted on said body portion, and a terminal fixed on said switch lever, a trip lever for said switch, said trip lever being operable by said key-levers to effect the closing of said switch, said operating arm being effective on its forward stroke to swing said switch as a whole about the pivot of said body portion to permit said trip lever to return to its normal position, and a switch opening lever, the latter engaging with said switch lever to open said switch on the return stroke of said operating arm.

8. In a typewriting machine, comprising a platen and type-bars, the combination of type-key-levers, one for each type-bar, an electric motor, a driver operable by said motor, devices whereby the type-bars may be connected with said driver by the depression of the type-key-levers, a normally open switch for said motor, a trip lever for said switch, and a universal bar connected to said trip lever, said universal bar being operable directly by any one of said type-key-levers to operate said trip lever to effect the closing of said switch.

9. In a typewriting machine, comprising a platen and type-bars to print against said platen, the combination of a motor, a switch, a trip lever, type-key-levers, said trip lever being operable by any one of the type-key-levers to effect the closing of the switch, means reciprocable by said motor, devices operable by said type-key-levers to connect the type-bars with the reciprocable means, and means to displace said switch to permit the trip lever to return to its normal position, so that the latter may assist in opening said switch, said key-levers being effective when held in their operated positions to prevent the return of said trip lever to permit the successive operations of the reciprocable means by said motor to cause the connected type-bar to successively print against the platen.

10. In a typewriting machine, comprising a platen and type-bars, the combination of key-levers, one for each type-bar, a motor, a driver operable by said motor, devices operable by said key-levers to connect the type-bars with said driver, a switch, means for closing said switch, and a trip-lever normally in position to oppose said closing means to hold said switch open, said trip-lever being movable by said key-levers out of said normal position to allow the switch to close to start said motor and operate said driver.

11. In a typewriting machine, comprising a platen and type-bars, the combination of key-levers, one for each type-bar, a motor, a driver operable by said motor, devices operable by said key-levers to connect the type-bars with said driver, a normally open switch, a trip-lever operable by said key-levers to effect the closing of said switch to start said motor, and means operable by said motor to displace said switch to permit the trip-lever to return to normal position.

12. In a typewriting machine, comprising a platen and type-bars, the combination of key-levers, a motor, a driver, a connecting link extending from said driver, a pivoted intermediate lever connecting the link with said driver, means operable by said key-levers to connect the type-bars with said driver, means operable by said key-levers to start said motor to operate said driver to swing the type-bars toward the platen, and means to vary te leverage of said intermediate lever, to vary the impact of the type-bars against the platen.

13. In a typewriting machine, comprising a platen and type-bars, the combination of key-levers, a motor, a driver, a connecting link extending from said driver, a pivoted intermediate lever connecting the link with said driver, means operable by said key-levers to connect the type-bars with said driver, means operable by said key-levers to start said motor to operate said driver to swing the type-bars toward the platen, and a link fixed at one end to the machine and pivotally connected at its other end to said intermediate lever, said last-named link being adjustable to vary the position of the intermediate lever to vary the impact of the type-bars against the platen.

14. In a typewriting machine, comprising a platen and type-bars, the combination of key-levers, a motor, a driver for said type-bars, means operable by said key-levers to connect the type-bars with said driver, means operable by said key-levers to start said motor, said motor being adapted to rotate continuously as long as a key-lever is depressed, and means connecting said motor and driver to transform the rotary motion of the motor into reciprocatory motion for said driver to cause the type-bars to print against the platen, the connecting means between the motor and the driver being adjustable to vary the impact of the type-bars against the platen.

15. In a typewriting machine, comprising a platen and type-bars, the combination of key-levers, a motor, a driver for said type-bars, means operable by said key-levers to connect the type-bars with said driver, means operable by said key-levers to start said motor, said motor being adapted to rotate continuously as long as a key-lever is depressed, and a linkage connecting said motor and driver to transform the rotary motion of the motor into reciprocatory motion for said driver to cause the type-bars to print against the platen, said linkage comprising fixed and movable links, the fixed link being adjustable to vary the travel of said driver to vary the impact of the type-bars against the platen.

16. In a typewriting machine, comprising a platen and type-bars to print against said platen, the combination of a motor, a switch for said motor, type-key-levers, means operable by said key-levers to effect the closing of said switch, a driver reciprocable by said motor, and means operable by said key-levers to connect the type-bars with said reciprocable driver, said motor being adapted to rotate continuously as long as a key-lever is depressed, to reciprocate said driver continuously to cause the corresponding type-bar to print its character repeatedly.

17. In a typewriting machine, the combination of a carriage, escapement mechanism therefor, a motor, a driver, a connecting link between said motor and said driver, a normally ineffective connection comprising an interponent between the escapement mechanism and said driver, a space-bar, means operable by the space-bar to render said interponent effective with said driver, and means operable by said space-bar to cause said motor to operate said driver after the interponent is rendered effective.

18. In a typewriting machine, the combination of a carriage, escapement mechanism therefor, a motor, a driver, a normally ineffective connection comprising an interponent between the escapement mechanism and said driver, a space-bar, means operable by said space-bar to render said interponent effective, means operable by said space-bar to cause said motor to operate said driver and consequently operate said escapement mechanism, a stop for said interponent, and a resilient connection between said interponent and said driver.

19. In a typewriting machine, the combination of a carriage, escapement mechanism therefor, a motor, a driver connected to said motor, a normally ineffective connection comprising an interponent between the escapement mechanism and said driver, a space-bar, means operable by the space-bar to render said interponent effective with said driver, means operable by said space-bar to cause said motor to operate said driver after the interponent is rendered effective, a stop for said interponent, a pivoted lever on said driver to engage said interponent, and a spring for said lever.

20. In a typewriting machine, the combination with a carriage having a platen thereon, of type-bars to strike against said platen, type-key-levers, connectors, a driver, said key-levers being operable to render said connectors effective with said driver, a motor, a universal bar operable by said key-levers, means operable by said universal bar to start said motor to operate said driver, said driver being effective to operate the connectors after they are rendered effective by the depressed key-levers, to swing the type-bars to the platen, escapement mechanism for said carriage, a second universal bar, the latter being engaged by the type-bars to operate said escapement mechanism, said last-named universal bar being carried by a swing-frame, a space-bar, a normally ineffective connection between said swing-frame and said driver, means operable by said space-bar to render said connection effective, and a connection between said space-bar and the first-mentioned universal bar, to start said motor to operate the driver, and consequently operate the escapement mechanism independently of the type-bars.

21. In a typewriting machine, comprising a platen and upper and lower-case types to print against said platen, the combination of platen-shifting mechanism, a motor, a shift-key-lever, and means operable by said shift-key-lever to connect said motor to said platen-shifting mechanism and to cause said motor to operate to shift said platen.

22. In a typewriting machine, comprising a platen and type-bars having upper and lower-case types to print against said platen, the combination of platen-shifting mechanism, a motor, a normally ineffective connection between said shifting mechanism and said motor, a shift-key-lever, said shift-key-lever being operable to render said connection effective, and means operable by said shift-key-lever to cause said motor to operate to shift said platen.

23. In a typewriting machine, comprising a platen and type-bars, the combination of key-levers, one for each type-bar, a motor, an operating arm connected to said motor, a driver connected to said operating arm, devices operable by said key-levers to render the type-bars effective with said driver, a normally open switch for said motor, said switch having a cam-surface, a trip-lever operable by said key-levers to effect the closing of said switch, said operating arm engaging said cam-surface on its forward stroke to displace said switch to permit said trip-lever to return to its normal position, and means operable by said operating arm on its return stroke to open said switch.

24. In a typewriting machine comprising a platen and type bars having upper and lower case types thereon, the combination of a platen frame, a carriage in which said platen frame is shiftably mounted, a shift-frame, a shift-key, a motor, a normally ineffective connection between the shift-frame and said motor, means operable by said shift-key to render said connection effective, and means operable by said shift-key to start said motor to operate said shift-frame by said connection, and consequently shift the platen to upper case position.

25. In a typewriting machine comprising a platen and type bars, the combination of platen shifting mechanism comprising a shift-frame, a motor, an operating arm connected with said motor, a normally ineffective thrust bar extending from said shift-frame to said operating arm, a shift-key lever, means operable by said shift-key lever to render said thrust bar effective with said operating arm, a switch for said motor, and means operable by said shift-key lever to close said switch to start said motor to cause said operating arm to engage with said thrust bar and operate the shift-frame, to shift the platen to its upper case position.

26. In a typewriting machine comprising a platen and type bars, the combination of platen shifting mechanism comprising a shift-frame, a motor, an operating arm connected to said motor, a thrust bar between said shift-frame and said operating arm, a shift-key-lever, a sub-lever operable by said shift-key lever, means connecting said thrust bar with said sub-lever, whereby said thrust bar may be brought into effective relation with the operating arm by the operation of said shift-key lever, a switch for said motor, and mechanism connected to said sub-lever to effect the closing of said switch to start said motor, to operate said thrust bar, through the intermediary of said operating arm and shift the platen to upper-case position.

27. In a typewriting machine comprising a platen and upper and lower-case types to print against said platen, the combination of platen-shifting mechanism, a motor, a shift-key lever, normally ineffective means, said means being renderable effective by said shift-key lever, a normally open switch for said motor, and a trip lever for said switch, said trip lever being operable by said shift-key lever to effect the closing of said switch to start said motor, to cause the latter to operate said platen-shifting mechanism through the intermediary of said normally ineffective means.

28. In a typewriting machine comprising a platen and type-bars having upper and lower-case types to print against said platen, the combination of platen-shifting mechanism, a motor, an operating arm connected with said motor, a normally ineffective thrust bar connected with said platen-shifting mechanism, a shift-key lever, means to render said thrust bar effective, a pivoted switch for said motor, a trip lever for said switch, means operable by said shift-key lever to operate said trip lever to effect the closing of said switch to start said motor, to cause the latter to operate said case-shifting mechanism through the intermediary of said thrust bar and said operating arm, said operating arm being effective on its forward stroke to swing said switch about its pivot to permit said trip lever to return to its normal position, and means operable by said operating arm on its return stroke to open said switch.

29. In a typewriting machine comprising a platen and types to print against said platen, the combination of case-shifting mechanism, a motor, a normally open switch for said motor, a shift-key lever, a trip lever operable by said shift-key lever to effect the closing of said switch, means operable by said motor to operate the case shifting mechanism, and means to release said trip lever to permit the latter to return to its normal position, the releasing means being operable by said motor.

30. In a typewriting machine comprising a platen and upper and lower case types to print against said platen, the combination of case shifting mechanism, a motor, a normally open switch for said motor, a trip lever, a shift-key lever, a normally ineffective connection between said motor and said case shifting mechanism, means operable by said shift-key lever to render said connection effective, means operable by said shift-key lever to operate said trip lever to effect the closing of said switch, said last-mentioned means comprising an intermediate lever engaging with said trip lever, and means operable by said connection, when the latter is operated by said motor, to swing said intermediate lever out of engagement with said trip lever to permit the latter to return to its normal position.

31. In a typewriting machine comprising a platen and upper and lower case types to print against said platen, the combination of case shifting mechanism comprising a shift-frame, a motor, a normally ineffective thrust bar, a normally open switch, a trip lever, a shift-key, means comprising an intermediate lever operable by said shift-key to operate said trip lever to effect the closing of said switch to start the motor to operate said thrust bar to swing said shift-frame to facilitate printing with upper case types, and a sub-lever operable by said thrust bar, when the latter is operated by said motor, to swing said intermediate lever out of engagement with said trip lever to permit the latter to return to its normal position.

32. In a typewriting machine comprising a platen and upper and lower-case types to print against said platen, the combination of a case-shifting mechanism, a motor, a shift-key lever, means operable by said shift-key lever to cause said motor to operate said case-shifting mechanism to facilitate typing with the upper-case types, and means to lock said case-shifting mechanism in its shifted position.

33. In a typewriting machine comprising a platen and upper and lower-case types to print against said platen, the combination of case-shifting mechanism, a motor, a shift-key lever, means operable by said shift-key lever to cause said motor to operate said case-shifting mechanism to facilitate typing with the upper-case types, means to lock said case-shifting mechanism in its shifted position, type-key levers, and means operable by the depression of any one of said type-key levers to release said case-shifting mechanism.

34. In a typewriting machine comprising a platen and type-bars having upper and lower-case types thereon, the combination of a platen-frame, a carriage in which said platen-frame is shiftably mounted, a shift-frame, a shift-key, a motor, a normally ineffective connection between the shift-frame and said motor, means operable by said shift-key to render said connection effective, means operable by said shift-key to start said motor to cause the latter to shift the platen to upper-case position through the intermediary of said connection, a latch to engage with said connection to lock the platen in its upper-case position, type-key levers, and means operable by any one of said type-key levers to free said connection from said latch, to permit the restoration of said platen to lower-case position.

35. In a typewriting machine comprising a platen, type-key levers and type-bars, the combination of platen-shifting mechanism comprising a shift-frame, a motor, an operating arm connected with said motor, a thrust-bar extending from said shift-frame to said operating arm, a shift-key, means operable by said shift-key to render said thrust-bar effective with said operating arm, a switch for said motor, means operable by said shift-key to close said switch to start said motor, to cause the latter to operate the shift-frame to shift the platen to its upper-case position through the intermediary of said operating arm and said thrust-bar, a latch to engage with said thrust-bar to lock the platen in its shifted position, means operable by said type-key levers to effect the closing of said switch to start said motor, means operable by said motor to operate the type-bars, a projection on said operating arm to engage said thrust-bar when the motor operates the type-bars, said projection being effective to raise the thrust-bar out of effective relation with the latch to effect the restoration of the platen to lower-case position.

36. In a typewriting machine comprising a platen and type bars having upper and lower-case types to print against said platen, the combination of case-shifting mechanism comprising a shift-key, a motor, a driver, a normally ineffective connection between said case-shifting mechanism and said motor, means operable by said shift-key to render said connection effective, a switch operable by said shift-key to start said motor to operate said case-shifting mechanism through the intermediary of said connection, type-key levers, devices operable by said type-key levers to connect said type-bars with said driver, means operable by said type-key levers to effect the closing of said switch to start said motor to operate the type bars, and means to retain said connection in its normal position, while the motor is driving said type-bars.

37. In a typewriting machine comprising a platen and type bars having upper and lower case types to print against said platen, the combination of case shifting mechanism, a motor to operate said case shifting mechanism, type-key levers, means operable by said type-key levers to cause the motor to operate said type bars, and means to prevent the actuation of said case shifting mechanism, while the motor is driving said type bars.

38. In a typewriting machine comprising a platen and type bars having upper and lower case types to print against said platen, the combination of case shifting mechanism for shifting said platen, a shift-key lever, type-key levers, one for each type bar, a motor, normally ineffective means, said means being renderable effective by said shift-key lever, a normally open switch, means operable by said shift-key lever to effect the closing of said switch to start said motor and operate the case shifting mechanism through the intermediary of the normally ineffective means, a latch for locking the platen in shifted position, a driver operable by said motor, devices operable by said type-key levers to connect the type bars with said driver, and means operable by said type-key levers to effect the closing of said switch to start said motor to cause the latter to operate said driver, the operation of said driver being effective to render said latch ineffective to release the platen by any type-key lever.

39. In a typewriting machine comprising a platen and type-bars having upper and lower case types to print against said platen, the combination of platen-shifting mechanism comprising a shift-frame, a shift-key-lever, type-key-levers, one for each type-bar, a motor, normally ineffective means connected with said shift-frame, said means being renderable effective by said shift-key-lever, a normally open switch, means operable by said shift-key-lever to effect the closing of said switch to start said motor to cause the latter to operate the platen-shifting mechanism through the intermediary of the normally ineffective means, a latch for locking the platen in shifted position, a driver operable by said motor, devices operable by said type-key-levers to connect the type-bars with said driver, and a trip-lever operable by said type-key-levers to effect the closing of said switch to start said motor to operate said driver, the operation of said driver by any type-key-lever being effective to render said latch ineffective to release said platen.

40. In a typewriting machine, the combination of a carriage, escapement mechanism therefor, a motor, a driver, a normally ineffective connection comprising an interponent between the escapement mechanism and said driver, a space-bar, means operable by said space-bar to render said interponent effective, means operable by said space-bar to cause said motor to operate said driver and consequently operate said escapement mechanism, and a stop for said interponent.

41. In a typewriting machine, comprising keys and types, a power-drive for said types comprising a motor, a normally open switch therefor, a trip lever, means operable by said keys to actuate said trip lever to effect the closing of said switch, and means operable by said motor to displace said switch to permit the trip lever to return to normal position, so that it may assist in opening said switch.

42. In a typewriting machine, comprising keys and types, a power-drive for said types comprising a motor, a normally open switch therefor, a trip lever, means operable by said keys to actuate said trip lever to effect the closing of said switch, an operating arm operable by said motor, said operating arm being effective on its forward stroke to displace said switch to permit the trip lever to return to its normal position, and means operable by said operating arm on its return stroke to open said switch.

43. In a typewriting machine, comprising keys and types, a power-drive for said types comprising a motor, a normally open switch therefor, said switch comprising a pivoted body portion, a terminal fixed thereon, a switch lever pivoted on said body portion, and a terminal fixed on said switch lever; a trip lever; means operable by said keys to actuate said trip lever to close said switch; an operating arm operable by said motor, said arm being effective on its forward stroke to swing said switch as a whole about the pivot of said body portion to permit said trip lever to return to normal position, a switch opening lever, and means operable by said arm on its return stroke to operate said switch opening lever, the latter engaging with said switch lever to open said switch.

44. In a typewriting machine, comprising keys and types, a power-drive for said types comprising a motor, a normally open switch for said motor, a trip lever, key-levers operable at will to actuate said trip lever, means reciprocable by said motor, and means driven by the reciprocable means to displace said switch to permit the trip lever to return to its normal position, so that the latter may assist in opening said switch, said key-levers being effective to prevent the return of said trip lever, to permit the motor to successively operate the reciprocable means.

45. In a typewriting machine, comprising keys and types, a power-drive for said types comprising a motor, said motor comprising a shaft, a crank-arm on said shaft, a normally open switch for said motor, means operable by said keys to close said switch to start said motor, an operating arm connected with and operable by said crank-arm, means operable by said operating arm to open said switch, and means to prevent an overthrow of said motor.

46. In a typewriting machine, comprising keys and types, a power-drive for said types comprising a motor, said motor comprising a shaft, a crank-arm on said shaft, a normally open switch for said motor, means operable by said keys to close said switch to start said motor, an operating arm connected with and operable by said crank-arm, means operable by said operating arm to open said switch, and a latch to engage said operating arm to prevent accidental movement thereof.

47. In a typewriting machine, comprising keys and types, a power-drive for said types comprising a motor, a normally open switch comprising a pivoted body portion, an operating arm to be operated by said motor, a latch normally in the path of said operating arm, and means operable by said keys whereby the closing of the switch may be effected and the latch taken out of the path of the operating arm.

48. In a typewriting machine, comprising keys and types, a power-drive for said types comprising a motor, a normally open switch comprising a pivoted body portion, an operating arm to be operated by said motor, a latch normally in the path of the operating arm, said latch being pivoted on the body portion of said switch, a spring tending to close said switch, a trip lever, and means operable by said keys to actuate said trip lever to permit said spring to swing said body portion to close said switch and swing the latch out of the path of the operating arm.

49. In a typewriting machine, comprising keys and types, a power-drive for said types comprising a motor, a normally open switch comprising a pivoted body portion, an operating arm to be operated by said motor, a latch normally in the path of the operating arm, said latch being pivoted on said body portion, a spring tending to close said switch, a trip lever, means operable by said keys to actuate said trip lever to permit said spring to swing said body portion, to close said switch and swing the latch out of the path of the operating arm, said operating arm being movable back and forth by said motor, said arm being effective on its forward movement to swing the switch as a whole about the pivot of the body portion, to permit the trip lever to return to its normal position, and means to move said latch into the path of the operating arm after the latter has returned to its normal position.

50. In a typewriting machine, comprising a platen and type-bars, the combination of key-levers, one for each type-bar, a motor, an operating arm connected to said motor, a driver connected to said operating arm, devices operable by said key-levers to render the type-bars effective with said driver, a normally open switch for said motor, said switch comprising a pivoted body portion, a terminal fixed thereon, a switch lever pivoted on said body portion, and a terminal fixed on said switch lever, said body portion having a cam surface, a trip-lever for said switch, said trip-lever being operable by said key-levers to effect the closing of said switch, said operating arm engaging said cam surface on its forward stroke to swing said switch as a whole about the pivot of said body portion to permit said trip-lever to return to its normal position, and a switch-opening lever, the latter engaging with said switch lever to open said switch on the return stroke of said operating arm.

51. In a typewriting machine, the combination of a carriage, escapement mechanism therefor, an electric motor, a space-bar, a switch for said motor, and means operable by said space-bar to close the switch to operate the escapement mechanism by said motor, said motor being adapted to rotate continuously as long as said space-bar is depressed to operate said escapement mechanism repeatedly.

52. In a typewriting machine, the combination of a carriage, escapement mechanism therefor, an electric motor, a driver, a connecting link between said motor and said driver, a normally ineffective connection comprising an interponent between the escapement mechanism and said driver, a space-bar, means operable by the space-bar to render said interponent effective with said driver, and means operable by said space-bar to cause said motor to operate said driver after the interponent is rendered effective, said motor being adapted to rotate continuously as long as said space-bar is depressed to operate said driver continuously to actuate said escapement mechanism repeatedly.

53. In a typewriting machine, comprising keys and types, the combination of a power-drive for said types comprising a motor, said motor comprising a shaft, a crank arm on said shaft, a normally open switch for said motor, means operable by said keys to close said switch to start said motor, an operating arm connected with and operable by said crank arm, and means operable by said operating arm to open said switch.

HENRY A. DEWING.

Witnesses:
JOHN P. HAESE,
ELLA B. HAESE.